US009206087B2

(12) United States Patent
Patt

(10) Patent No.: US 9,206,087 B2
(45) Date of Patent: Dec. 8, 2015

(54) PROCESS FOR BONDING ARRAYS OF CERAMIC FILTERS

(71) Applicant: Dow Global Technologies LLC, Midland, MI (US)

(72) Inventor: Jeremy Patt, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 14/391,237

(22) PCT Filed: Feb. 26, 2013

(86) PCT No.: PCT/US2013/027765
§ 371 (c)(1),
(2) Date: Oct. 8, 2014

(87) PCT Pub. No.: WO2014/003829
PCT Pub. Date: Jan. 3, 2014

(65) Prior Publication Data
US 2015/0129106 A1    May 14, 2015

Related U.S. Application Data

(60) Provisional application No. 61/665,362, filed on Jun. 28, 2012.

(51) Int. Cl.
*B32B 41/00* (2006.01)
*C04B 37/00* (2006.01)
*B01D 46/24* (2006.01)

(52) U.S. Cl.
CPC ............... *C04B 37/00* (2013.01); *B01D 46/24* (2013.01); *B01D 46/2418* (2013.01); *C04B 37/005* (2013.01)

(58) Field of Classification Search
CPC ........... B01D 46/2418; B01D 46/0001; C04B 38/0006; Y10T 29/49826; Y10T 428/24149
USPC ............... 156/89.22, 296, 312, 581; 428/116; 29/428
See application file for complete search history.

(56) References Cited

U.S. PATENT DOCUMENTS 3,899,326 A    8/1975  Frost et al.
4,001,028 A    1/1977  Frost et al.
(Continued)

FOREIGN PATENT DOCUMENTS

EP    1435348 A1    7/2004
EP    1508355 A1    2/2005
(Continued)

OTHER PUBLICATIONS

Reed, J., Principles of Ceramic Processing, Wiley Interscience, 1988, Chapters 20 and 21, Part 1 (pp. 329-372) and Part 2 (pp. 373-379).

*Primary Examiner* — Michael N Orlando
*Assistant Examiner* — Joshel Rivera
(74) *Attorney, Agent, or Firm* — Kevin J. Nilsen

(57) ABSTRACT

A method comprising; a) assembling a plurality of ceramic filters, into an array wherein two or more of the outer surfaces of each filter are located adjacent to outer surfaces of other ceramic filters with removable spacers located between the adjacent surfaces of ceramic filters such that the spaces between, the adjacent surfaces are uniform m a work surface; b) removing sequentially one or more of the ceramic filters or horizontal rows of the ceramic filters and removing the spacers between adjacent surfaces until a single ceramic fitter or horizontal row remains; c) applying a cement layer to the outer surface of the single ceramic filter or horizontal row on the work surface; d) replacing the next adjacent ceramic filter or horizontal row of ceramic filters in the location the ceramic filler or horizontal row of ceramic filters were removed from; e) sequentially applying layers of cement to the outer surface of a ceramic filter or outer surfaces of a horizontal row of ceramic filters and replacing the next adjacent ceramic filter or horizontal, row of ceramic filters in the location or locations the ceramic filter or horizontal rows of ceramic filters were removed from, until all of the ceramic filters are replaced in the same position on the work surface with uniform cement layers located between all adjacent surfaces of rise ceramic filters.

14 Claims, 6 Drawing Sheets

(56) References Cited

U.S. PATENT DOCUMENTS

| | | |
|---|---|---|
| 4,162,285 A | 7/1979 | Tanabashi |
| 4,329,162 A | 5/1982 | Pitcher, Jr. |
| 4,741,792 A | 5/1988 | Matsuhisa et al. |
| 4,786,542 A | 11/1988 | Yasuda et al. |
| 4,837,943 A | 6/1989 | Mizutani |
| 4,948,766 A | 8/1990 | Talmy et al. |
| 5,173,349 A | 12/1992 | Yavuz et al. |
| 5,538,681 A | 7/1996 | Wu |
| 5,914,187 A | 6/1999 | Naruse et al. |
| 6,582,796 B1 | 6/2003 | Joulin et al. |
| 6,669,751 B1 | 12/2003 | Ohno et al. |
| 6,797,666 B2 | 9/2004 | Harada et al. |
| 6,953,554 B2 | 10/2005 | Wallin et al. |
| 7,396,576 B2 | 7/2008 | Masukawa et al. |
| 7,485,594 B2 | 2/2009 | Saha et al. |
| 7,879,428 B2 | 2/2011 | Ohno et al. |
| 2004/0020359 A1 | 2/2004 | Koermer et al. |
| 2006/0254713 A1 | 11/2006 | Fujita et al. |
| 2008/0014404 A1 | 1/2008 | Miyakawa et al. |
| 2008/0271422 A1 | 11/2008 | Zawisza |
| 2009/0070982 A1* | 3/2009 | Nishio et al. ............ 29/428 |
| 2009/0239030 A1 | 9/2009 | Cai et al. |
| 2012/0001358 A1 | 1/2012 | Clark |

FOREIGN PATENT DOCUMENTS

| | | |
|---|---|---|
| EP | 1612197 A1 | 1/2006 |
| EP | 2147905 A1 | 1/2010 |
| WO | 03051488 A1 | 6/2003 |
| WO | 2004011124 A1 | 2/2004 |
| WO | 2004011386 A1 | 2/2004 |

* cited by examiner

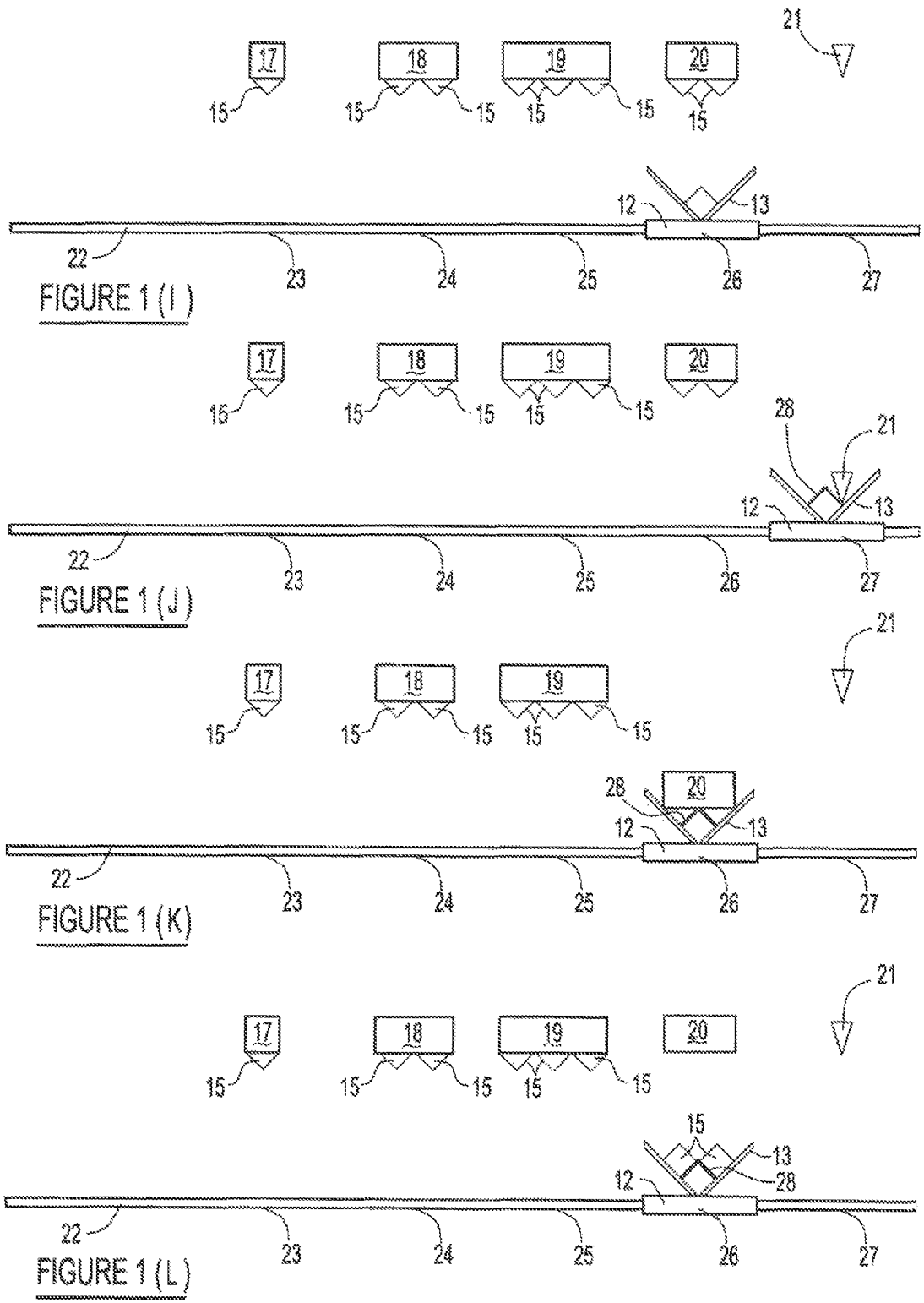

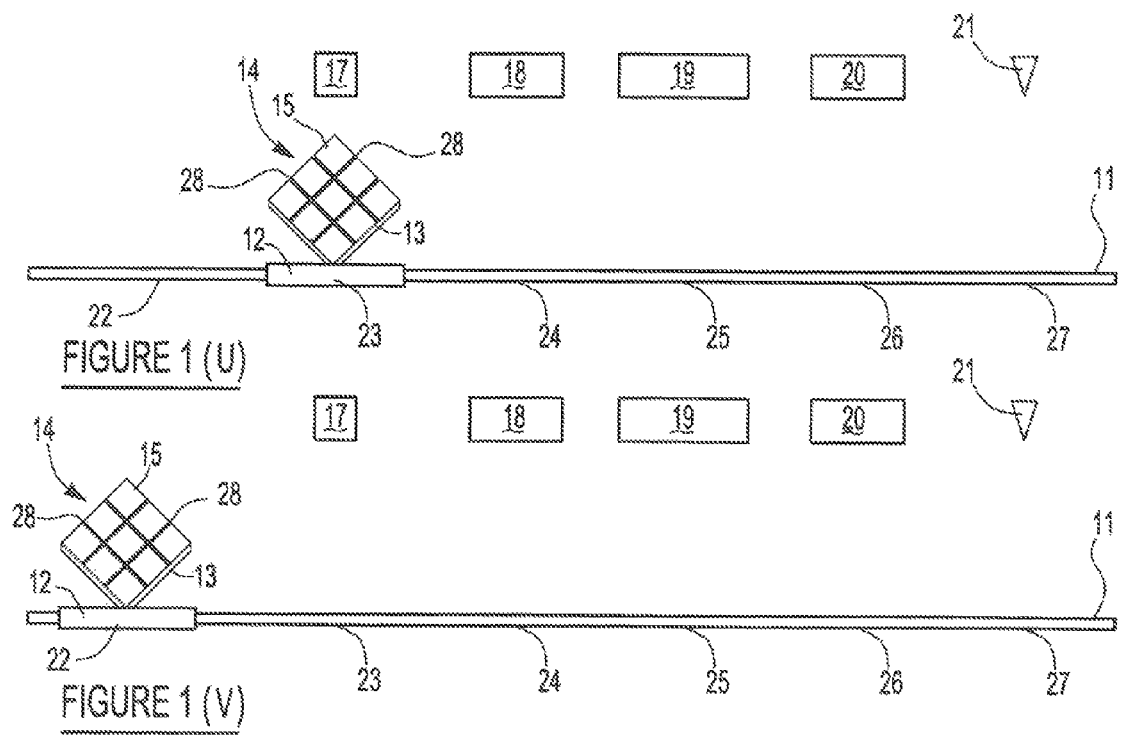

PROCESS FOR BONDING ARRAYS OF CERAMIC FILTERS

FIELD OF THE INVENTION

The present invention relates generally to a process for bonding arrays of ceramic filters together such that the bond thickness between the ceramic filters is consistent.

BACKGROUND OF THE INVENTION

Diesel engines, because of the way they operate, emit soot particles or very fine droplets of condensate or a conglomerate of the two (particulates) as well a typical harmful gasoline engine exhausts (i.e., HC and CO). These "particulates" (herein Diesel soot), are rich in condensed, polynuclear hydrocarbons, some of which may be carcinogenic. As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. When using such a filter, the filter must be periodically regenerated by burning off the soot. This burning of soot results in stresses from axial and radial temperature differences that can cause cracking of the filter.

To overcome stresses, ceramic honeycombs such as heat exchangers and filters have reduced the stresses and potential for cracking the honeycombs by assembling smaller honeycombs into larger honeycombs. Cement layers between the honeycombs have been used, for example, to increase the thermal conductivity to reduce the ultimate temperature reached in the assembled honeycomb such as described by EP 1508355. The dimensions of the cement layers between the segments are important to the performance of the larger assembled honeycombs. If they are too thin, there may be inadequate adhesion and mechanical failure during use of the honeycombs. If they are too thick, there may be excessive thermal gradients during heating and cooling of the honeycomb which can also result in mechanical failure of the honeycombs. Further if the seams are too thick the honeycomb may exhibit high back pressures, which can negatively impact the performance of the honeycombs and the systems utilizing the honeycombs.

It is known to use spacers to control the thickness of the adhesive layer in the assembled ceramic parts. Such spacers may remain in the adhesive layers once the assembled ceramic parts are completed or they need to be removed by burning them out in a burn-out process. In other processes special apparatus are required for assembly which contain the spacers in the assembly apparatus. See for instance EP 1,435,348; EP 1,612,197; US 2006/0254713; and US 2008/0014404 all incorporated herein by reference in their entirety. Such processes require special assembly steps, burn out steps or leave spacers and/or the residue of the spacers in the seams which can reduce the effectiveness of the resulting ceramic filters.

Thus, what is needed are methods of assembling arrays of ceramic filters which is elegant, avoids the use of specialized spacer systems, avoids leaving spacers or the residue of spacers in the arrays and which does not detract from the ultimate performance of the resulting arrays of ceramic parts.

SUMMARY OF THE INVENTION

The present invention relates to a method comprising: a) assembling a plurality of ceramic filters having square or rectangular cross-sectional shapes, four outer surfaces and common lengths into an array wherein two or more of the outer surfaces of each filter are located adjacent to outer surfaces of other ceramic filters with removable spacers located between the adjacent surfaces of ceramic filters such that the spaces between the adjacent surfaces are uniform on a work surface; b) removing sequentially one or more of the ceramic filters or horizontal rows of the ceramic filters and removing the spacers between adjacent surfaces until a single ceramic filter or horizontal row remains; c) applying a cement layer to the outer surface of the single ceramic filter or horizontal row on the work surface; d) replacing the next adjacent ceramic filter or horizontal row of ceramic filters in the location the ceramic filter or horizontal row of ceramic filters were removed from which location or locations place surfaces of the ceramic filters in contact with the cement layer or layers applied to the adjacent surfaces of the ceramic filters; e) sequentially applying layers of cement to the outer surface of a ceramic filter or outer surfaces of a horizontal row of ceramic filters and replacing the next adjacent ceramic filter or horizontal row of ceramic filters in the location or locations the ceramic filter or horizontal rows of ceramic filters were removed from, which location or locations place surfaces of the ceramic filter or ceramic filters in contact with the cement layer or layers applied to the adjacent surfaces of the ceramic filters until all of the ceramic filters are replaced in the same position on the work surface with uniform cement layers located between all adjacent surfaces of the ceramic filters.

The invention may further comprise drying the cement so as to bond the ceramic filters together into an array. Preferably the work surface is a flat or v shaped work surface. In a preferred embodiment the process includes removing sequentially horizontal rows of the ceramic filters and removing the spacers between adjacent surfaces until as single ceramic filter or horizontal row remains. In preferred embodiments, the ceramic filters are removed using a system which replaces the ceramic filters in the same location relative to the work surface. Preferably the work surface moves to a plurality of locations where the system removes or replaces the ceramic filters. Preferably prior to replacing the ceramic filters, a layer of cement is applied to the surfaces of the ceramic filters located on the work surface which surfaces of the ceramic filters are adjacent to the location that subsequent ceramic filters will be replaced. The spaces between the adjacent ceramic filters in an assembled array having spacers located in the spaces can be analyzed to determine if the spaces are within a specified overall thickness and the variation along the spaces is within a specified acceptable range of variation. If any space is outside of the specified thickness and variation in thickness, the array can be diassembled and reassembled until the desired specifications are attained.

The methods of the invention allow consistent application of adhesive layers within specific thickness and thickness variation limits. The methods do not require the use of assembly apparatus with special spacers built-in, avoid leaving spacers or the residue of spacers in the assembled arrays. The methods allow adjusting the thickness of the cement layer from array to array or run of arrays to arrays. The system allows for the use of different thicknesses of cement in the same array while staying within specified cement layer variance limits.

DETAILED DESCRIPTION

Figure 1:
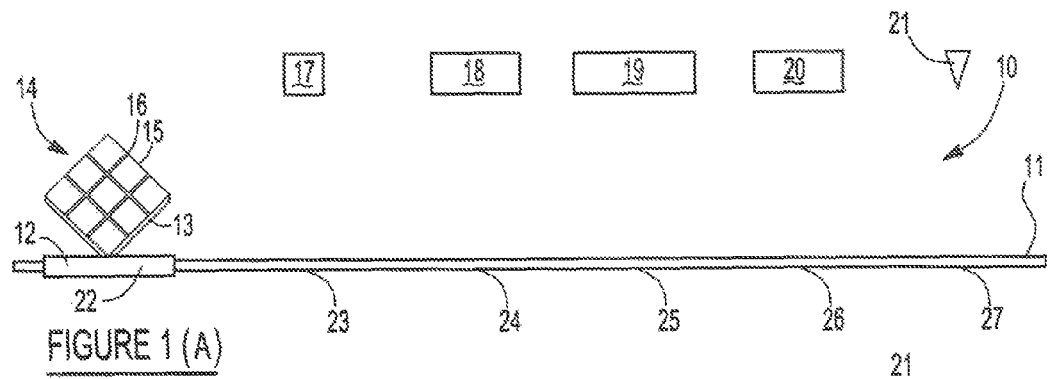
FIGS. 1 A to V exemplify the various steps in a process performed according to the invention.
Figure 1:
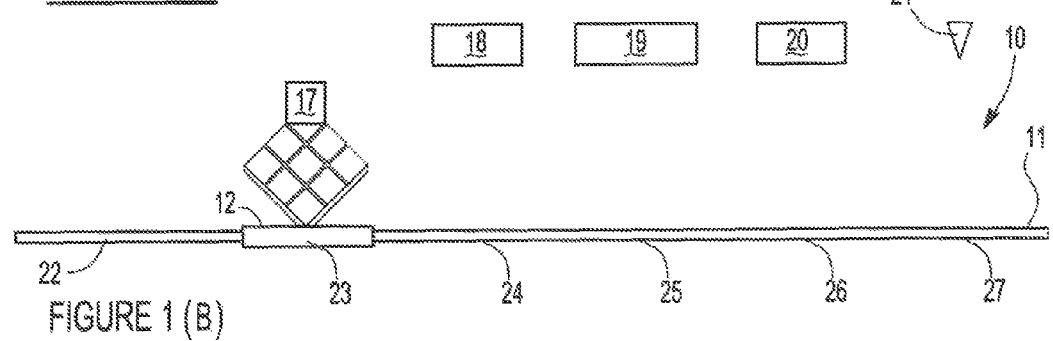
Figure 1:
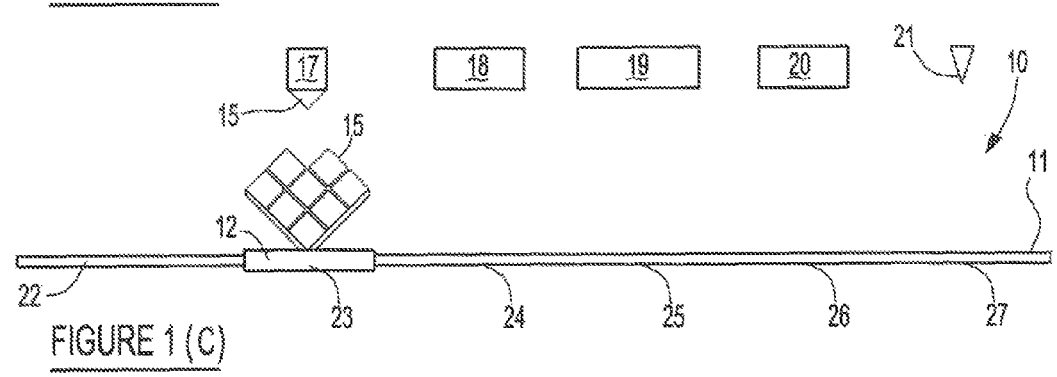
Figure 1:
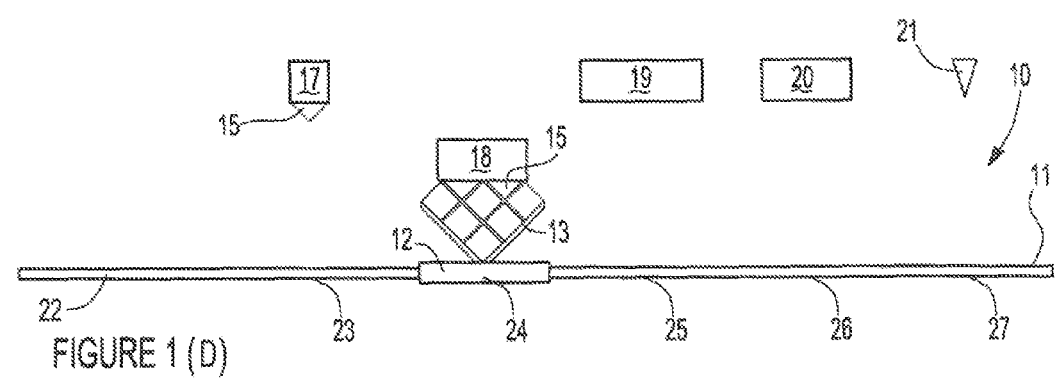
Figure 1:
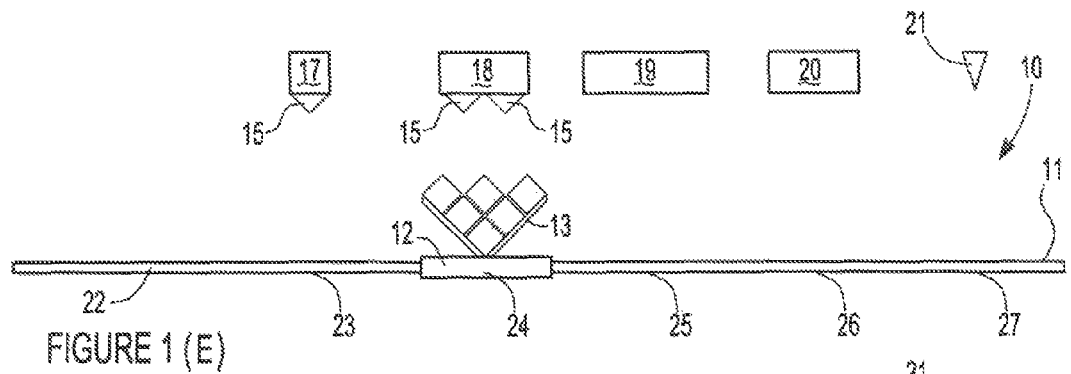
Figure 1:
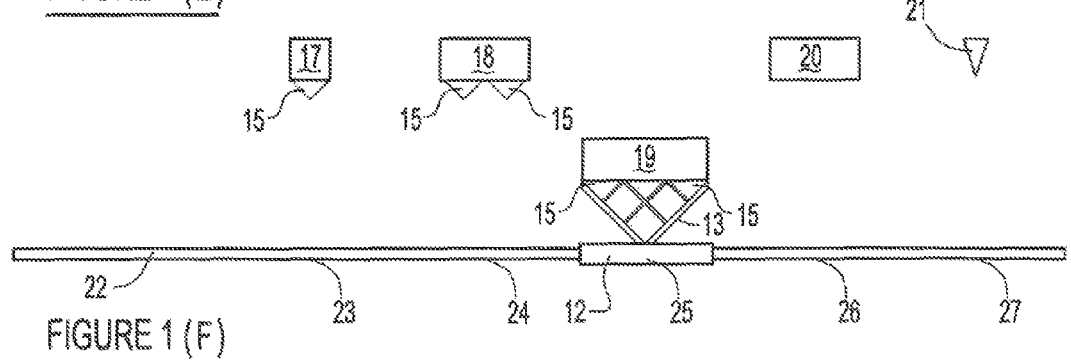
Figure 1:
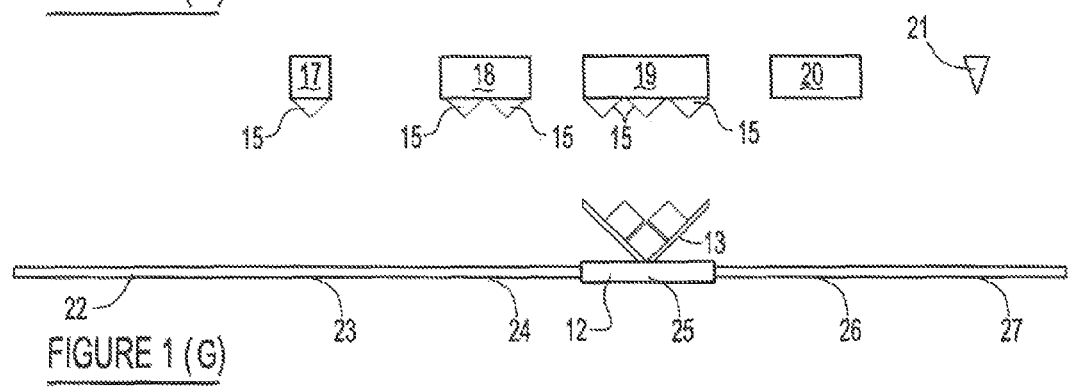
Figure 1:
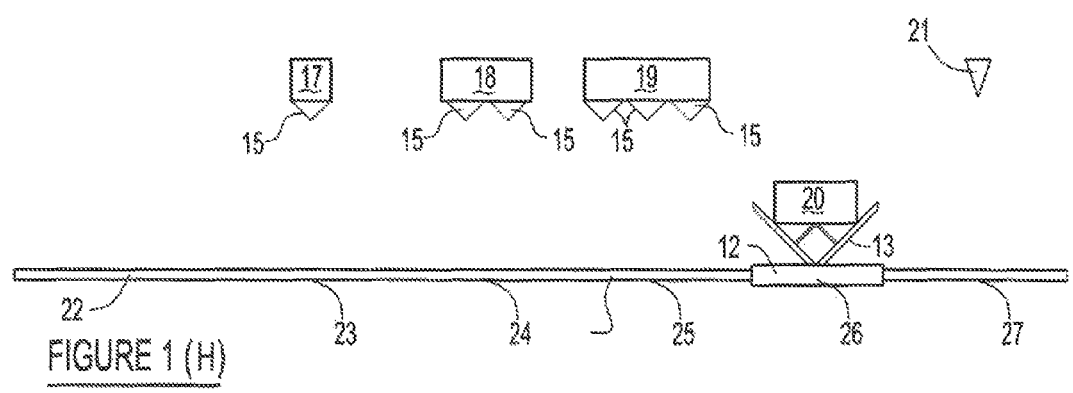
Figure 1:
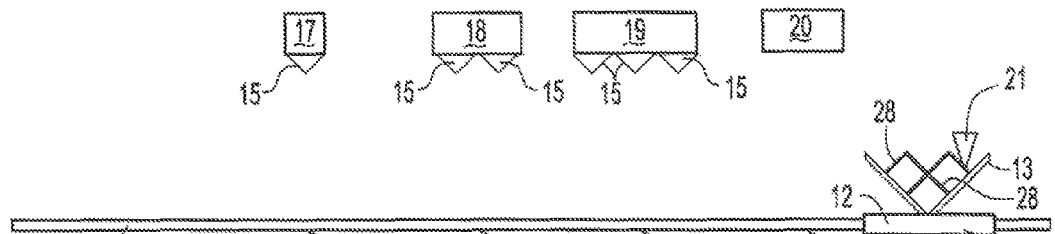
Figure 1:
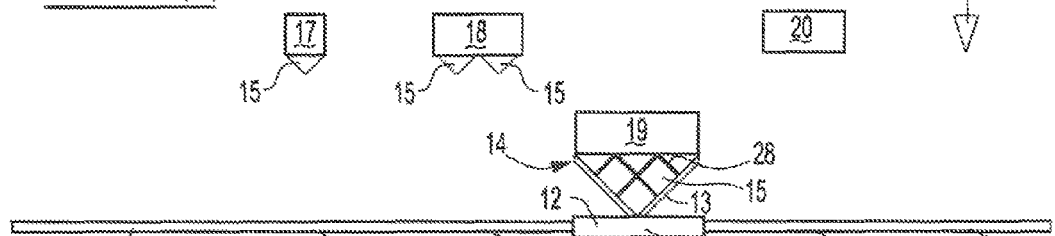
Figure 1:
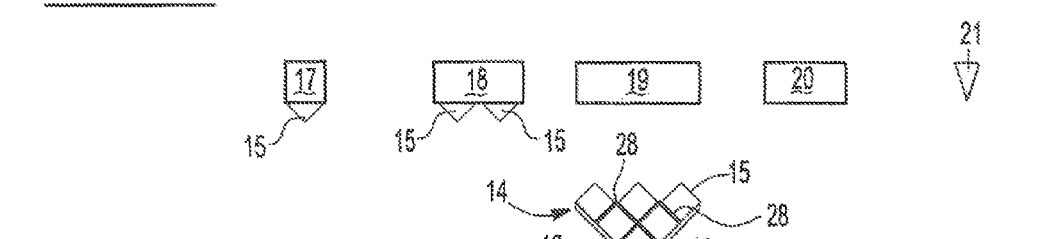
Figure 1:
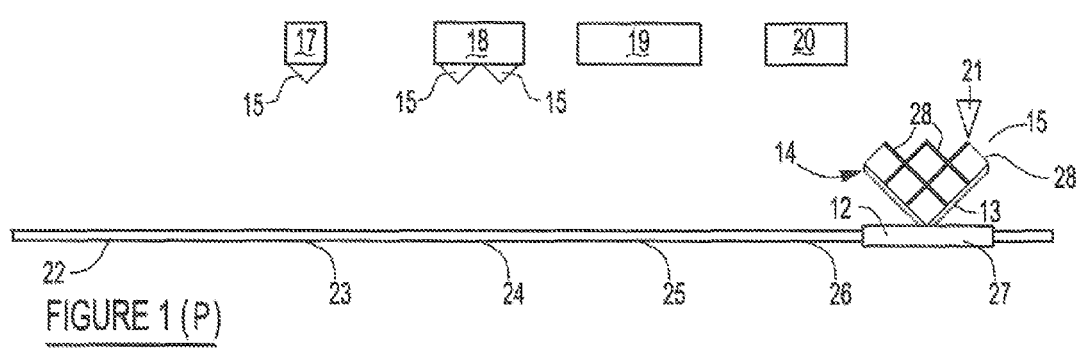
Figure 1:
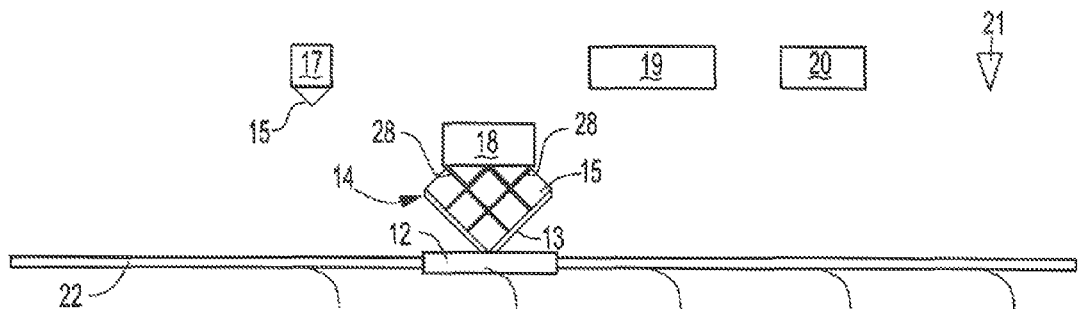
Figure 1:
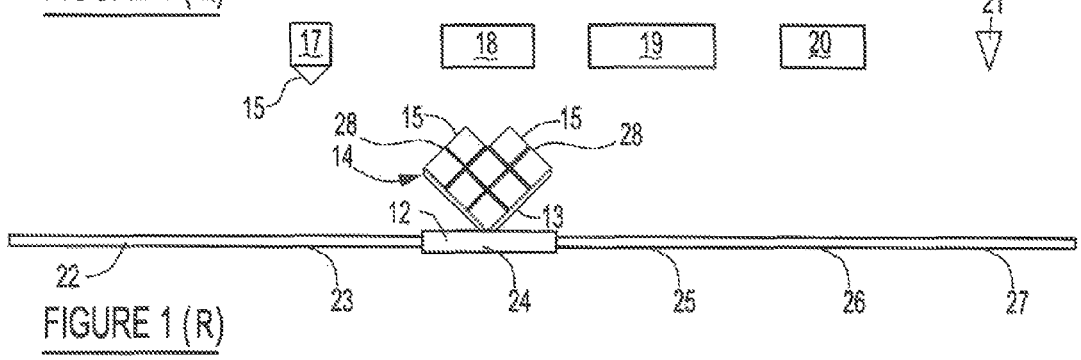
Figure 1:
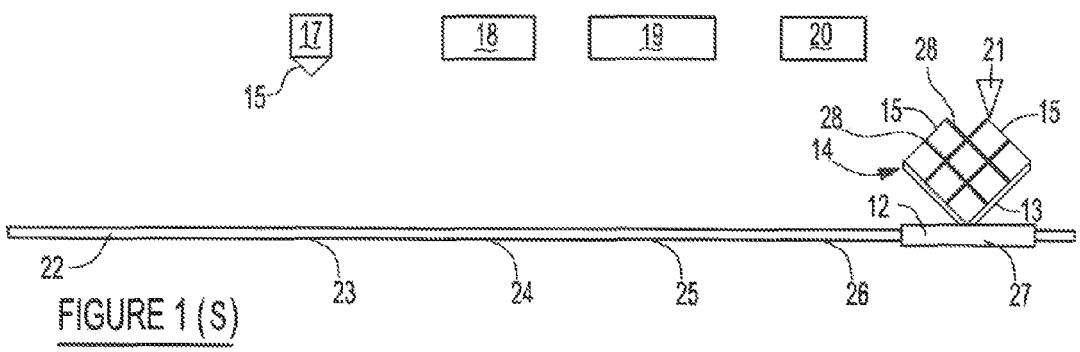
Figure 1:
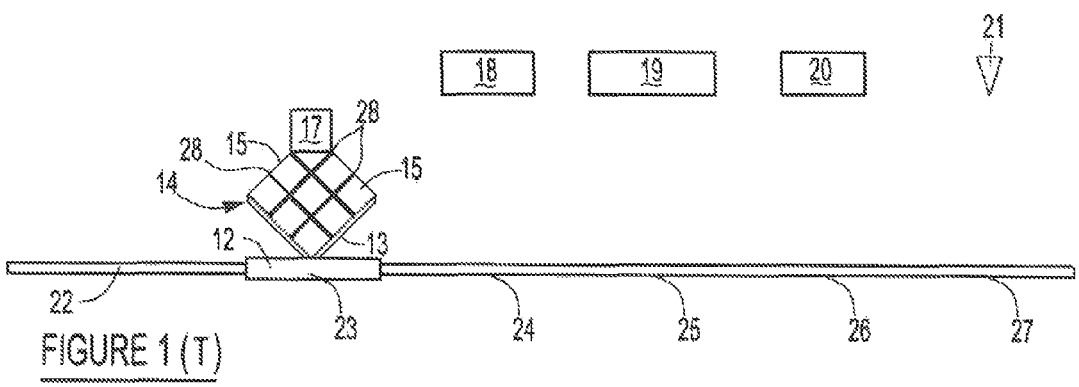

The disclosures of all articles and references, including patent applications and publications, are incorporated by reference for all purposes. The following claims are hereby incorporated by reference into this written description. This application claims priority from U.S. Provisional Ser. No. 61/665,362 filed Jun. 28, 2012, incorporated herein by reference in its entirety. One or more as used herein means that at least one, or more than one, of the recited components may be used as disclosed.

The invention relates to a method of assembling a plurality of ceramic filter segments into an array of ceramic filter segments which are bonded together using a cement of consistent thickness. Consistent thickness means that the cement layers disposed between two adjacent ceramic segments exhibit a thickness within a specified range and the variation of the thickness along the bonded adjacent surfaces is within a specified range of variation of the thickness. The size of the ceramic filter segments, number of segments bonded together and the ultimate use or the array of bonded ceramic filter segment will impact what is an acceptable thickness and variation of the thickness of a bond. Ultimately the specified range of thickness and the variation in thickness of a bond is chosen such that the performance of the array is maximized and the impact of the adhesive layers on the performance of the arrays is minimized. The specified range of thickness with respect to the cement layers located between two adjacent ceramic filter segments is the acceptable range of the average thickness of the cement layers. The specified variation of a cement layer with respect to the thickness of the cement layer is the variation of the thickness in a single cement layer. The process of the invention utilizes spacers to control specified thickness of the spaces into which cement layers and are placed the specified variation in thickness of the individual cement layers located between adjacent ceramic filter segments. As the arrays of ceramic filter segments are assembled spacers are placed between adjacent ceramic filter segments. Spacers are placed between each adjacent ceramic filter segments to define the space between the segments and the thickness of the cement layer to be placed between the ceramic filter segments. The ceramic filter segments and the spacers are assembled on a work space. The work space functions to provide a surface upon which to assemble the ceramic filter segments and in preferred embodiments to control the arrangement of the ceramic filter segment, spacers and ultimately the cement layers. After the array of ceramic filter segments and spacers is assembled, the individual segments or horizontal rows of segments are removed such that the location from which each segment or row of horizontal segments is removed with respect to the work surface is located and retained. Horizontal row of segments means a row of ceramic filter segments that is located in a row in a single horizontal plane and which can be removed in the same operation. In one embodiment a horizontal row of segments may be bonded together along adjacent surfaces prior to assembly of the array, for example if a flat work surface is used and the adjacent ceramic filters are square, the adjacent ceramic filters in a row can be prebonded together. Segment as used herein means a ceramic filler segment. After each segment or horizontal row of segments is removed from an assembled array of segments and spacers, the spacers exposed by such removal are then removed from the array. This process is repeated until either one ceramic filter segment or one horizontal row of ceramic filter segments remain on the work surface. Cement is applied to the exposed surface of the ceramic filter segments which will be adjacent to a surface of a ceramic filter segment which will be placed on the array. After application of the cement layer, a ceramic filter segment or row of horizontal ceramic filter segments, is placed on the work surface in the same location with respect to the work surface from which ceramic filter segments were removed. The ceramic filter segment or horizontal row of ceramic filter segments are placed an contact with cement layers applied to the surface of ceramic filter segment(s) disposed on the work surface. Application of the cement layers and replacement of the ceramic segments or horizontal row of ceramic segments is continued until the array of ceramic filter segments is assembled with all of the ceramic filter segments located in the same location with respect to the work surface as when assembled previously with cement layers located between the adjacent surfaces of the ceramic filter segments in place of the spacers. The array may be subjected to an operation to hold the assembled ceramic filter segments together to retain them in the same relative location with respect to tone another until the cement sets. The process may further comprise processing the cement so as to irreversibly bond the ceramic filters together into the array. The array may be subjected into any process which forms the cement layer into a rigid layer which holds its structure, for example the array may be exposed to conditions such that the cement layer sinters to form a ceramic layer bonding the adjacent ceramic filter segments together.

Ceramic filter segments mean ceramic structures having in one direction a plurality of walls defining flow passages. The ceramic filter segments have two opposing ends with the flow passages open at one or both ends. In a preferred embodiment, each passage is open at only one end and on each end each open flow passage is surrounded by closed flow passages. As a corollary on each end each closed flow passage is surrounded by open flow passages. From the end perspective every other flow passage is open and every other flow passage is closed. Closed means that the flow passage is plugged to prevent the flow of fluid through end of the flow passages. This structure is designed to force fluid entering an inlet end of the ceramic filter segment, usually in the form of an assembled array, to flow through the walls of the ceramic filter segments to the adjacent flow passages and out the other end of the ceramic filter segment which are open on the opposite end. Particulate matter of a certain size is unable to flow through pores in the walls of the ceramic filter segments and thus are removed from the fluid passing through the walls. Thus each ceramic filter segment contains two opposing faces on each end of the segment. Perpendicular to the plane of both ends is a plurality of flat surfaces on the outside of each ceramic filter segment. The flat surfaces are adapted to fit to adjacent flat surfaces of other ceramic filter segments and to be bonded to such adjacent surfaces using an adhesive as described herein. The cross sectional shape of the segments can be any cross sectional shape that facilitates assembly of an array of ceramic filter segments as described herein. Preferably each surface each segment can be placed adjacent to another surface of a ceramic filter segment such that the surface match in size and surface area. Preferably each side of the ceramic filter segments that will be disposed adjacent to the surface of another ceramic filter segment is flat and capable of matching the surface of the adjacent filter segment in size and surface area. The surfaces of the segments which will not be disposed adjacent to a surface of another segment may be of any desired shape consistent with the ceramic filter segment functions. Preferably each side of the ceramic filter segments is flat and capable of matching the surface of the adjacent filter segment in size and surface area. Preferably the cross sectional shape of the ceramic filter segments is polygonal and facilitates forming an array such that all of the surfaces of the segments can be located adjacent to another surface of a segment. Preferably the cross sectional shape is hexagonal, square or rectangular and most preferably square.

The arrays are assembled on a work surface. Any work surface that facilitates assembly of arrays of ceramic filter segments using the process described herein may be utilized. The work surface can be stationary or move to a plurality of work stations designed to perform the operations described herein. If the work surface moves to a plurality of work stations it can be disposed on a moveable surface, for instance one or more conveyors. Work surface can be of any shape that facilitates assembly of the arrays, for example flat or v shaped and preferably v shaped. The operations of placement of the ceramic filter segments, placement of spacers, removal of the ceramic filter segments, removal of the spacers and application of the adhesive, and fixing the array of ceramic filter segments together may take place in one location, in separate locations, or some of the steps may be performed in one location and the other steps in other locations. For instance a cement layer can be deposited and placement of one of more ceramic filter segments in contact with the deposited cement layer can take place in the same location. The particular arrangement of operations is controlled in many instances by the selection of the equipment utilized for each step. In one embodiment each step is performed in separate work stations and the work surface is moved to each work station in sequence. In another embodiment the work surface is placed in a stationary location and the equipment that performs each operation moves to the work surface location. Where the work surface is moved, it can be moved in one direction for placement of ceramic filter segments, spacers and cement and in the opposite direction for removal spacers and ceramic fitter segments. Such process would involve moving the work surface in one direction for placement of the ceramic filter segments and spacers; moving the work surface in the opposite direction for removal of the ceramic filters and spacers; and moving the work surface in the first direction to apply cement and replace the ceramic filter segments.

The spacers function to set the thickness of the space between adjacent ceramic filter segment surfaces and thus the thickness of the space available for the cement layer between adjacent ceramic filter surfaces in an assembled array of ceramic filter segments. The spacers can be prepared from any material that is capable of retaining its shape and which does not damage the surface of the ceramic filter segments during the process of the invention. Exemplary material include metals, thermoplastics, thermosets, composites, paper or wood based materials, textiles and the like. Preferably the spacers are prepared from plastics. The spacers preferably exhibit a hardness that is capable to prevent particulate matter or impurities on the surface of the ceramic filter segments from damaging the surfaces. Preferably the spacers exhibit a shore durometer of about 80 Shore A or less and most preferably about 50 Shore A or less. The spacers preferably exhibit a consistent thickness as defined herein. Spacers of different thickness may be used in the assembly of an array where it is desirable that different locations of the adhesive layers exhibit different thicknesses. The spacers can be solid or have void spaces provided the spacers retain the thickness of the space between the adjacent surfaces of ceramic filter segments at a consistent thickness. The spacers may comprise a mesh structure, foam structures, sheets, corrugated sheets, and the like. The spacers size is selected to define a consistent thickness gap as described hereinbefore. Preferably the spacer is of such a size that the spacer is located between about 50-percent or greater of the adjacent surface area of adjacent surfaces of ceramic filter segments, preferably about 70 percent of the adjacent surface area and most preferably about 90 percent of the surface area or greater. In one embodiment the spacers may be located between about 100 percent of the surface area of the adjacent surfaces of the ceramic filter segments. In another embodiment a portion of one or more of the spacers ma be disposed outside of the space(s) between adjacent ceramic filter segments. This portion outside of the spaces may facilitate removal of the spacers as described herein. In another embodiment the spacers can be located in more than one space between more than one pair of adjacent surfaces of ceramic filter segments. A single spacer may be located between two adjacent horizontal rows of ceramic filter segments and such a single spacer may also have a portion outside of the spaces as described hereinbefore.

The systems for placement and removal of the ceramic filter segments can be any known system which can pick up and move the ceramic filter segments which is capable of remembering the location of ceramic filter segments with respect to the work surface and placing (replacing) them on the array on the work surface in the same location with respect to the work surface as the segments were removed from. The system can exhibit from 1 to 6 axis of movement per station. Systems with only one axis of movement require that the work surface be moved into place for placement, removal and replacement of the ceramic filter segments. Where systems exhibit greater than 2 axis of movement the work surface can move or be stationary with the system moving to the work surface location. Exemplary systems include robots, pneumatically-actuated 2-d slides, linear motion systems, rotary motion systems, and the like. The systems can be pneumatic, hydraulic and electromechanical driven motion systems. The system for placement (replacement) of the ceramic filter segments includes a part holding system which functions to pick up the ceramic filter parts and hold them while being moved or between removing them from the work surface and replacing them on the work surface. Any system that can hold the ceramic filter segments and move them may be used. The holding system can be a system which clamps along the ends of the ceramic, filter segments, a vacuum, pneumatic, hydraulic or servoelectric gripping systems, and the like. Any holding system should not damage the ceramic filter segment surfaces or ends. Preferably the holding system exerts about 1.0 MPa or less of pressure on the segments and more preferably about 0.2 MPa or less.

The spacers can be removed from the arrays of ceramic filter segments by any method that moves them from the array. They can be removed manually or by an apparatus. The spacers can be removed by a mechanical gripper, gravity, vacuum, or compressed gases (air) and the like. The nature of the spacer can impact the choice of removal system.

Once the array of ceramic filter segments with cement disposed between the adjacent surfaces of the ceramic filter segments is assembled, the segments can be secured with respect to one another to prevent movement with respect to one another until the cement is set. Any means of securing and restraining the ceramic filter segments may be used. Exemplary systems include pneumatic hydraulic or servoelectric grippers and the like.

The cement layer may be applied using any system that is capable of applying a consistent amount of cement. Manual application of the cement is possible but not preferred. Robotically driven cement application systems are well known in the art. One or more cement application stations may be used. In a preferred embodiment a single cement application station is utilized and the either the cement dispenser is moved to the application location or the work surface is moved to the location of the cement application station.

The adhesive layer is applied at a consistent amount. The consistent thickness which is within the specified thickness range is achieved as a result of the placement of the segments or horizontal rows of segments in the specified location. Preferably an excess of cement is applied. Preferably the excess cement can be applied in an excess sufficient to form a cement layer of the desired thickness with the specified variation in thickness. More preferably the cement is applied in an excess of about 40 volume percent or less and even more preferably in an amount of about 30 volume percent or less. The specified thickness is achieved by placing the segments together at the specified location. The excess cement is squeezed out from between the adjacent ceramic filter segments when the adjacent segments are placed in contact with the cement in the specified location. After assembly of the array the excess cement can be removed, either in the wet state or after drying. For a particular use of an array, array design or location in an array the specified thickness can vary. In some preferred embodiments the specified thickness of the space the cement layer is located in is about 0.5 mm or greater and more preferably 1.0 mm or greater. In some preferred embodiments the specified thickness of the space the cement layer is located in is about 2.5 mm or less and more preferably 2.0 mm or less. In addition it is desired that the spaces the cement layers are located in have a specified variation in the thickness of the layer. Preferably this variation is less than about 1.5 mm and more preferably less than about 1.0 mm. Preferably this variation is 0 mm.

The ceramic filter segments may be formed by any suitable process such as those known in the art, the most common being extrusion of a ceramic plastic mass comprised of ceramic particulates and extrusion additives and liquids to make the mass plastic and to bond the particulates. The extruded ceramic filter segments precursors are then typically dried of carrier liquids, removal of organic additives such as lubricants, binders and surfactants by heating and further heating such that the ceramic particulates fuse or sinter together or create new particulates that subsequently fuse together. Such methods are described by numerous patents and open literature with the following merely being a small representative sample of U.S. Pat. Nos. 4,329,162; 4,741,792; 4,001,028; 4,162,285; 3,899,326; 4,786,542; 4,837,943 and 5,538,681, all incorporated herein by reference.

Ceramic filter segments are generally prepared by contracting one or more precursors for the ceramic stricture, ceramic precursors, optionally one or more binders and one or more liquid carriers. The ceramic precursors are the reactants or components which when exposed to certain conditions form a ceramic body or part, wet ceramic filter segment greenware bodies. Any known ceramic precursors may be utilized in the formation of wet ceramic filter segment greenware bodies and ultimately ceramic filter segments. Included in ceramic precursors are the precursors utilized to prepare one or more of mullite (such as disclosed in U.S. Pat. No. 7,485,594; U.S. Pat. No. 6,953,554; U.S. Pat. No. 4,948,766 and U.S. Pat. No. 5,173,349 all incorporated herein by reference), silicon carbide, cordierite, aluminum titanate, alumina, zirconia, silicon nitride, aluminum nitride, silicon oxynitride, silicon carbonitride, beta spodumene, strontium aluminum silicates, lithium aluminum silicates, and the like. Preferred porous ceramic bodies include mullite, silicon carbide, aluminum titanate, cordierite, and compositions containing ceramind binders and ceramic fibers, mullite or combination thereof. Preferred silicon carbides are described in U.S. Pat. Nos. 6,582,796, 6,669,751B1 and WO Publications EP1142619A1, WO 2002/070106A1. Other suitable porous bodies are described by WO 2004/011386A1, WO 2004/011124A1, US 2004/0020359A1 and WO 2003/051488A1, all incorporated herein by reference. Organic binders useful include any known materials which render the wet ceramic precursor mixture shapeable. Preferably, the binders are organic materials that decompose or burn at temperatures below the temperature wherein the ceramic precursors react to form ceramic filter segments. Among preferred binders are those described in *Introduction in the Principles of Ceramic Processing*, J. Reed, Wiley Interscience, 1988) incorporated herein by reference. A particularly preferred binder is methyl cellulose (such as METHOCEL A15LV methyl cellulose, The Dow Chemical Co., Midland, Mich.). Liquid carriers include any liquid that facilitates formation of a shapeable wet ceramic mixture. Among preferred liquid carriers (dispersants) are those materials described in *Introduction to the Principles of Ceramic Processing*, J. Reed, Wiley Interscience, 1988). A particularly preferred liquid carrier is water. The mixture useful in preparing wet ceramic greenware bodies may be made by any suitable method such as those known in the art. Examples include, ball milling, ribbon blending, vertical screw mixing, V-blending and attrition milling. The mixture may be prepared dry (i.e., in the absence of a liquid carrier) or wet. Where the mixture is prepared in the absence of a liquid carrier, a liquid carrier is added subsequently utilizing any of the methods described in this paragraph.

The mixture of ceramic precursors, optionally binders, and liquid carriers may be shaped by any means known in the art. Examples include injection molding, extrusion; isostatic pressing, slip casting, roll compaction and tape casting. Each of these is described in more detail in *Introduction to the Principles of Ceramic Processing*, J. Reed, Chapters 20 and 21, Wiley Interscience, 1988, incorporated herein by reference. In a preferred embodiment the mixture is shaped into the near net shape and size of the ultimate desired ceramic filter segments. Near net shape and size means the size of the we ceramic greenware body is within 10 percent by volume of the size of the final ceramic body, and preferably the size and shape is within 5 percent by volume of the size of the final ceramic filter segments. In a preferred embodiment, the wet ceramic filer segment ovenware body is shaped such that it can be utilized as a flow through filter. At this stage in the process the wet ceramic greenware body has two opposing faces which are substantially planar. The wet ceramic filter segment greenware body exhibits a cross sectional shape which is consistent for all planes parallel to the two opposing face. Preferably, at this stage, all of the flow passages are open to both opposing faces. This allows more efficient removal of liquid carrier.

Thereafter the wet ceramic filter segment greenware body is subjected to conditions to remove the liquid carrier, that is to dry the wet ceramic filter segment greenware body. Preferably the wet ceramic filter segment greenware body is placed on a carrying structure while it is subjected to the liquid carrier removal conditions. The carrying structure performs the function of supporting the wet ceramic filter segment greenware body through the liquid carrier removal process. Additionally, the carrying structure performs one or more of the following functions: preventing the part of the wet ceramic greenware body in contact with the carrying structure from deforming (that is increasing the bow of a linear path or flat surface or deviation of a flat surface from a perfectly planar stricture); allowing one or more drying fluids to contact the part of the wet ceramic greenware body in contact with the carrying structure; and allowing any liquid carrier exiting the wet ceramic greenware body to move away from the wet ceramic greenware body. Preferred carrying sheets are described in co-owned co-pending application titled "DRYING METHOD FOR CERAMIC GREEN-WARE" filed Jun. 22, 2011 U.S. Ser. No. 13/166,298 and PCT application number PCT/US/11/41410 both incorporated herein by reference. The method of the invention for removing liquid carrier from a wet ceramic filter segment greenware body involves placing the wet ceramic filter segment body on a carrier structure and placing the wet ceramic greenware body on the carrier structure in an oven under conditions such that the liquid carrier is substantially removed from the ceramic greenware body.

Any oven which Assists in removing the liquid carrier from the wet ceramic body may be utilized in this method. Among preferred ovens useful in the invention are convection, infrared, microwave, radio frequency ovens and the like. In a more preferred embodiment a microwave oven is used. The wet ceramic fiber segment body on a carrier structure may be placed in an oven for a sufficient time for the liquid carrier to be substantially removed from the ceramic filter segment greenware body and then removed from the oven. The wet ceramic filter segment body on a carrier structure can be manually placed in and removed from the oven. Alternatively the wet ceramic fiber segment body on a carrier structure can be automatically introduced, moved through and removed from an oven. Any automatic means for introducing a part into and removing a part from an oven may be utilized. Such means are well known in the art, in a preferred embodiment, the wet ceramic filter segment body on a carrier structure is placed on a conveyor and passed through one or more ovens on the conveyor. The residence time of a wet ceramic filter segment body on a earlier structure in the one or more ovens is chosen such that under the conditions of the one or more ovens substantially all of the liquid carrier is removed. The residence time is dependent upon all of the other conditions, the size of the wet ceramic filter segment greenware structure and the amount of liquid earner to be removed. The temperature that the wet ceramic filter segment body on a carrier structure is exposed to in the one or more ovens is chosen to facilitate the removal of the liquid carrier from the wet ceramic filter segment body. Preferably the temperature is above the boiling point of the liquid carrier and below the softening temperature of material from which the carrier structure is fabricated and the temperature at which any of the ceramic precursors decompose. Preferably, the temperature that the wet ceramic filter segment body on a carrier structure is exposed to in the oven is about 60° C. or greater, more preferably about 80° C. or greater and most preferably about 100 or greater. Preferably, the temperature that the wet ceramic filter segment body on a carrier structure is exposed to in the oven is about 120° C. less and most preferably about 110° C. or less. The wet ceramic filter segment greenware body in the oven is preferably contacted with a drying fluid or a vacuum is applied to the oven to facilitate removal of liquid carrier from the wet ceramic filter segment body. Preferably, the wet ceramic filter segment greenware body is contacted with a drying fluid. In the embodiment, wherein the wet ceramic filter segment greenware both is shaped as the precursor to a flow through filter, wherein the flow passages in the wet ceramic fitter segment greenware body have not been plugged at one end, it is preferable to flow the drying fluid through the flow passages, of the wet ceramic filter segment greenware body. This is facilitated by directing the drying fluid to flow in the same direction as the flow passages are disposed on the carrier structure. Where the wet ceramic filter segment greenware body has a flat planar side and the wet ceramic filter segment greenware body is disposed on the carrier structure on its flat planar side, the flow of the drying fluid is directed to flow through the flow passages in the wet ceramic filter segment greenware body. In the embodiment wherein the wet ceramic filter segment greenware body on the carrier structure is passed through one or more ovens on a conveyor, wet ceramic filter segment greenware bodies are disposed such that the direction of the flew passages are transverse to the direction of the conveyor and the drying fluid is passed in a direction transverse to the direction of the conveyor such that the drying fluid passes through the flow passages of the wet ceramic filter segment greenware bodies. If one face of the wet ceramic filter segment greenware body is disposed on the earner structure, the drying fluid is directed up through the carrier structure in the direction of the wet ceramic filter segment greenware body so that the drying fluid passes into and through the flow passages in the wet ceramic greenware body. The drying fluid can be any fluid which enhances the removal of liquid carrier from the vicinity of the wet ceramic filter segment greenware body. Preferably the drying fluid is a gas. Preferred gasses include air, oxygen, nitrogen, carbon dioxide, inert gasses and the like. Most preferably the drying fluid is air. After the drying fluid is contacted with the wet ceramic greenware body it is removed from the vicinity of the wet ceramic filter segment greenware body along with the liquid carrier entrained in the drying fluid. The flow of drying fluid is generated by any means which facilitates movement of a drying fluid such as a pump, a blower, and the like. The flow rate of the drying fluid is chosen to facilitate the removal of liquid carrier from the vicinity of the wet ceramic filter segment greenware body. Other important parameters for drying ceramic parts are: two frequency regimes of microwave power (2.45 GHz and 915 MHz), varied reflected powers at those frequencies (from about 0 to about 100%), relative humidity that can vary from about 0 to about 100%, residence time that can vary from about 0.01 to about 10 hours in periodic oven or belt driven continuous ovens, and a maximum part temperature that can range from about 50 to about 150° C.

After removal of le liquid carrier from the wet ceramic filter segment greenware body, the ceramic filter segment greenware body can be prepared for conversion to a ceramic filter segment and converted to a ceramic filter segment. The ceramic filter segment greenware body is exposed to conditions to burn out the binder and to form the ceramic filter segment structure. Processes to achieve this are well known in the art. The dry ceramic filter segment greenware parts are calcined by heating the dry ceramic filter segment greenware parts to temperatures at which organic additives and binders are volatilized or burned away. The parts are further heated to temperatures at which the ceramic particles fuse or sinter together or create new particulates that subsequently fuse together. Such methods are described by numerous patents and open literature including U.S. Pat. Nos. 4,329,162; 4,471, 792; 4,001,028; 4,162,285; 3,899,326; 4,786,542; 4,837,943 and 5,538,681; all incorporated herein by reference.

In a preferred embodiment the ceramic filter segment prepared is comprised of acicular mullite. In this embodiment, the porous ceramic filter segment greenware body may be heated under an atmosphere having fluorine and a temperature sufficient to form the mullite composition. Fluorine may be provided in the gaseous atmosphere from sources such as $SiF_4$, $AlF_3$, HF, $Na_2 SiF_6$, NaF, and $NH_4$ F. Preferably, the source of fluorine is $SiF_4$. The dried greenware may be heated under an atmosphere having a fluorine containing gas that is separately provided and to a temperature sufficient to form the mullite composition. "Separately provided" means that the fluorine containing gas is supplied not from the precursors in the mixture (for example, $AlF_3$), but from an external gas source pumped into the furnace heating the mixture. This gas preferably is a gas containing $SiF_4$. The part is preferably heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. The first temperature may be from about 500° C. to about 950° C. The second temperature may be any temperature suitable depending on variables such as the partial pressure of $SiF_4$. Generally, the second temperature is at least 1000° C. to at most 1700° C. Generally, during the heating to the first temperature, the atmosphere is inert or a vacuum until at least 500° C., which is when a separately provided fluorine containing gas is desirably introduced. The part may be heated to a heat treatment temperature of at least 950° C. under a heat treatment atmosphere selected from the group consisting of air, water vapor, oxygen, an inert gas and mixtures thereof, for a time sufficient to form the mullite composition. Examples of inert gases include nitrogen and the noble gases (that is, He, Ar, Ne, Kr, Xe, and Rn). Preferably, the heat treatment atmosphere is an inert gas, air, water vapor or mixture thereof. More preferably, the heat treatment atmosphere is nitrogen, air or air containing water vapor. The time at the heat treatment temperature is a function of the heat treatment atmosphere and temperature selected. For example, a heat treatment in wet air (air saturated with water vapor at 40° C.) generally requires more than several hours to 48 hours at 1000° C. In contrast, ambient air, dry air or nitrogen (air having a relative humidity from 20 percent to 80 percent at room temperature) desirably is heated to 1400° C. for at least 2 hours. Generally, the time at the heat treatment temperature is at least about 0.5 hour and is dependent on the temperature used (that is, generally, the higher the temperature, the shorter the time may be). The time at the heat treatment temperature may be about 1 hour or more, preferably about about 2 hours or more, more preferably about 4 hours or more, even more preferably about 6 hours or more, or most preferably at least about 8 hours to preferably at most about 4 days, more preferably at most about 3 days, even more preferably at most about 2.5 days and most preferably at most about 2 days. To ensure that any Mg and/or Fe impurities stay incorporated within the glassy phase at the acicular mullite, the heat treatment temperature is preferably at least 1000° C. to preferably at most 1700° C.

The formation of the ceramic filter segments, as described above, involves placing the ceramic filter segment greenware on a carrier having a surface suitable for supporting ceramic filter segment greenware, for instance flat surface, and then placing the ceramic filter segment greenware on the carrier in one or more furnaces sequentially, wherein the furnaces are adapted to perform the steps described above.

Preferably the greenware or ceramic parts are marked with at least one reference mark. The mark can be applied in any manner which allows the reference side (surface) to be identified throughout the rest at the process for forming a ceramic part. The reference mark can be applied manually or in an automatic manner. In a preferred manner the reference mark is unique to each part so that the parts can be tracked through the process. The reference mark is preferably applied after extrusion or drying.

After completion of processing the ceramic filter segments, two or more of the ceramic filter segments may be adhered together using processes known in the art, such as disclosed in US Publication 2009/02390309; US Patent Publication 2008/0271422; U.S. Pat. No. 5,914,187; U.S. Pat. No. 6,669,751; U.S. Pat. No. 7,879,428; U.S. pat. No. 7,396,576, all incorporated herein by reference. The adhesive cement utilized can be any adhesive known for this use as including those disclosed in the patents and patent publications cited herein. In a preferred embodiment, ceramic ceramic filter segments comprised of at least two separate smaller ceramic ceramic filter segments (honeycombs) that have been adhered together by a cement comprised of inorganic fibers and a binding phase wherein the ceramic filter segments are bonded together by the binding phase which is comprised of an amorphous silicate, aluminate or alumino-silicate cermanic binder invention is a method of forming a ceramic structure comprising contacting a first ceramic segment on at least one of its outer sides (surfaces) with a cement comprised of inorganic fibers having an average length between 100 micrometers to 1000 micrometers, a carrier fluid, a colloidal inorganic sol and in the absence of other inorganic particles, wherein the fibers have a solids loading of at least about 10% by volume of the total volume of the cement, mechanically contacting a second ceramic segment with the first ceramic segment such that the cement is interposed between the ceramic segments such that the ceramic segments are adhered; heating the adhered segments sufficiently to form amorphous ceramic bonding between the fibers of the cement and the ceramic segments to form the larger ceramic structure (array). After a segment or segments are contacted on their outer side with the cement, the segments are contacted with the cement interposed between the segments by any suitable method of doing so. Once the segments are adhered, the carrier fluid is removed by heating or any suitable method, which may include just ambient evaporation or any other useful method such as those known in the art. The removal may also occur during the heating to form the amorphous binding of the fibers and the segments. Heating may also be used to remove any organic additives in the segments or cement. This heating may be an suitable such as those known in the art and may also occur during the heating to form the amorphous binding of the fibers and segments together. To create the amorphous binding phase, the heating should not be so high a temperature that crystallization occurs in the fiber (unless desired) or amorphous binding phase, sagging honeycomb structure or migration of the glass binding phase to an extent that is deleterious to the performance of the honeycomb structure. Typically, the temperature is at least about 600° C. to at most about 1200° C. After the parts are adhered together into an array the outside side of the segmented part may be shaped by any means known in the art, for example by grinding, cutting or sanding. Once shaped, the outside side is coated with a ceramic precursor to form a solid side (skin) and the part is exposed to conditions to render the coating a ceramic coating.

The assembled array of ceramic filter segments with spacers can be analyzed to determine if the distance between adjacent ceramic filter segments meets the specified thickness and specified thickness variation requirements. If the measured distances do not meet the specified parameters the array can h disassembled or partially disassembled and re assembled. This can avoid the preparation of out of specification arrays. The assembled arrays can be examined by any system that can determine the thickness of the spaces or adhesive layers between the adjacent segments. Examples of analytical systems that can be utilized include cameras, lasers, automated image processing, signal processing and the like.

In preferred embodiments the segment cross sectional area is from about 5 to 20 square inches and the length is from about 3 to about 20 inches. The ceramic parts may be used in any applications in which it is useful to have ceramic honeycombs, such as particulate filters (e.g., Diesel Particulate filters), and flow channel catalyst branches (catalytic converted).

One of the advantages of the invention is that spacers are used to control the thickness of the adhesive layer without bonding them into the structure. In a preferred embodiment the segments in the array are all fixtured at the same time. This avoids the need for multiple pick and place assembly operations that may add significant variation to orientation of the segments with respect to one another.

One embodiment of the invention is illustrated in FIGS. 1 A to V wherein each step shows a step in the process. Shown is an assembly line 10 having a conveyor 11 a linear slide form 12 which is capable of moving in 2 directions and supports a v-nest work surface 13. On the work surface 13 is an assembled array 14 of ceramic filter segments 15 with spacers 16 disposed between the adjacent ceramic filter segments 15. Also shown are four grippers 17 to 20 for the removal of ceramic filter segments 15 from the array 14 on the work surface 13. Each gripper 17 to 20 removes a portion of the ceramic filter segments 15 and retains them during a portion of the process, each adapted for gripping the segments 15 on their ends, moving the segments 15 and holding the segments 15 above the conveyor 11 during other operations. Preferably the grippers 17 to 20 can travel in the vertical direction and can be stroked between two discrete positions, the holding position (upper) and the placing position (lower). A cement dispensing nozzle is shown by 21. The nozzle 21 path can be automated using a robot or linear motion gantry. The linear slide 12 can be locked into any one of six discrete positions. From left to right is the load/unload position 22, four successive stack and unstack positions 23 to 26, and cement dispense position 27. FIG. 1A shows the array 14 of ceramic filter segments 15 with spacers between the adjacent segments below the first removal step with the work surface 13 in position 22. The array 14 shows a 3 by 3 array of segments 15. The process can be scaled to any size of an array, for example 4 by 4, 5 by 5 and 6 by 6 arrays. FIG. 1 B shows moving the work surface 13 to position 23, dropping the gripper 17 for the removal of ceramic filter segment to grip a first ceramic fitter segment 15 by its ends. FIG. 1C shows the work surface 13 in position 23 with the gripper 17 raised to its upper position with the first ceramic segment 15 held by the gripper 17. FIG. 1D shows the work surface 13 at location 24, a second gripper 18 gripping a horizontal row of two ceramic filter segments 15 by their ends. The gripper 17 to holds a first ceramic filter segment 15 by its ends in an upper position. FIG. 1 E shows both of the second gripper 18 gripping a horizontal row of two ceramic filter segments 15 and the first gripper 17 holding a first ceramic filter segment 15 by their ends in the upper position for each. FIG. 1F shows the work surface 13 at location 25, a third gripper 19 gripping a horizontal row of three ceramic filter segments 15 by their ends. FIG. 1 F also shows the second gripper 18 gripping a horizontal row of two ceramic filter segments 15 and the first gripper 17 holding a first ceramic filter segment 15 by their ends in the upper position for each. FIG. 1 G shows the third gripper 19 gripping a horizontal row of three ceramic filter segments 15 in the upper position for each. FIG. 1H shows the work surface 13 at location 26, a third gripper 19 gripping a horizontal row of three ceramic filter segments 15 by their ends, gripper 20 gripping a second horizontal row of two ceramic filter segments 15 by their ends. FIG. 1H also shows the previously removed ceramic filter segments 15 held in the upper position by the first, second and third grippers 19, 20 and 21. FIG. 1 I shows the second horizontal row of ceramic filter segments is moved to the upper position of the fourth gripper 20 and eight previously removed ceramic filler segments 15 held in the upper position in the first through fourth grippers for the removal of ceramic filter segments 17, 18 and 19. FIG. 1 J shows the work surface in the adhesive application location 27 wherein a cement layer 28 is applied to the one remaining ceramic filter segment 15 on the work surface 13 using an adhesive application nozzle 21. FIG. 1 K shows work surface 13 moved to location 26 where gripper 20 places the second horizontal row of ceramic filter segments 15 adjacent to the ceramic filter segment 15 having a cement layer 28 disposed on its surface where the second horizontal row of ceramic filter segments 15 is placed in the same place with respect to the work surface 13 from which it was removed. FIG. 1 L shows gripper 20 raised to its upper position leaving the second horizontal row of ceramic filter segments 15 adjacent to the ceramic filter segment 15 having a cement layer 28 disposed on its surface where the second horizontal row of ceramic filter segments 15 is placed in the same place with respect to the work surface 13 from which it was removed. FIG. 1 M shows the work surface in the adhesive application location 27 wherein a cement layer 28 is applied to the second horizontal row of ceramic filter segments 15 on the work surface 13 using a cement application nozzle 21. FIGS. 1 O to U show the sequential application of a cement layer 28 and replacement of horizontal rows of ceramic filters 15 until the array 14 is reassembled with cement layers in place of the spacers. In FIG. 1 V the work surface returns to the load and unload position 22. The array 14 can then be unloaded from the work surface 13.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A method comprising:
   a) assembling a plurality of ceramic filters having square or rectangular cross-sectional shapes, four outer surfaces and common lengths into an array wherein two or more of the outer surfaces of each filter are located adjacent to outer surfaces of other ceramic filters with removable spacers located between the adjacent surfaces of ceramic filters such that the spaces between the adjacent surfaces are uniform on a work surface;
   b) removing sequentially one or more of the ceramic filters or horizontal rows of the ceramic filters and removing the spacers between adjacent surfaces until a single ceramic filter remains;
   c) applying a layer of a cement to the outer surface of the single ceramic filter on the work surface;
   d) replacing the next adjacent ceramic filter or horizontal row of ceramic filters in the location the ceramic filter or horizontal rows of ceramic filters were removed from, which location or locations place surfaces of the ceramic filters in contact with the cement layer or layers applied to the adjacent surfaces of the ceramic filters;
   e) sequentially applying layers of cement to the outer surface of a ceramic filter or outer surfaces of a horizontal row of ceramic filters and replacing the next adjacent ceramic filter or horizontal row of ceramic filters in the location or locations the ceramic filter or horizontal rows of ceramic filters were removed from, which location or locations place surfaces of the ceramic filter or ceramic filters in contact with the cement layer or layers applied to the adjacent surfaces of the ceramic filters until all of the ceramic filters are replaced in the same position on the work surface with uniform cement layers located between all adjacent surfaces of the ceramic filters, wherein the work surface moves to a plurality of locations where the system removes or replace the ceramic filters.

2. A method according to claim 1 which further comprises hardening the cement so as to bond the ceramic filters together into an array.

3. A method according to claim 1 wherein the work surface is a flat or v shaped work surface.

4. A method according to claim 1 which comprises removing sequentially horizontal rows of the ceramic filters and removing the spacers between adjacent surfaces until a single ceramic filter or horizontal row remains.

5. A method according to claim 1 wherein the ceramic filters are removed using a system which replaces the ceramic filters in the same location relative to the work surface.

6. A method according to claim 1 wherein prior to replacing the ceramic filters a layer of cement is applied to the surfaces of the ceramic filters located on the work surface which surfaces of the ceramic filters are adjacent to the location that the ceramic filters will be replaced.

7. A method according to claim 1 wherein once one or more of the ceramic filters are placed the thickness and/or the consistency of the thickness of the spaces between the adjacent surfaces having spacers located between them is measured.

8. A method according to claim 7 wherein one or more of the filters are removed from the work surface if one or more spaces do not meet predetermined specifications of thickness.

9. A method according to claim 1 wherein the spacers are in contact with 70 percent or greater of the area of the adjacent ceramic filters.

10. A method according to claim 1 wherein the spacer is a mesh structure.

11. A method according to claim 1 wherein the spacer is comprises a plastic structure.

12. A method according to claim 1 wherein the spacers are reused.

13. A method according to claim 1 wherein once each of the ceramic filters are replaced the ceramic filters are restrained so that they remain in the same location with respect to the other ceramic filters.

14. A method according to claim 1 wherein the thickness of the adhesive layer is between about 0.5 and 2.5 mm and the variation along any two ceramic filter surfaces is 1.0 mm or less.

* * * * *